Patented Feb. 9, 1943

2,310,225

UNITED STATES PATENT OFFICE 2,310,225

PROCESS OF ISOMERIZATION OF FATS AND OILS

William R. Eipper, Wilkes-Barre, Pa.

No Drawing. Application November 21, 1939, Serial No. 305,557

11 Claims. (Cl. 99—118)

This invention is a method of raising the melting points of natural fats or oils containing esters of oleic acid and its homologues, and the products resulting from such process.

It has long been desirable to raise the melting point of natural fats or oils which, at ordinary temperatures, are liquid or semi-solid, in order to prevent rapid deterioration of such fats or oils without resorting to refrigeration. This is particularly true of oils or fats used as foodstuffs or in the preparation of foodstuffs such as cottonseed oil, cocoanut oil, peanut oil, butter, cream, chocolate and the like.

All known processes for raising the melting point of such oils or fats are characterized by certain objectionable features such as the necessity for costly apparatus, operations under high temperatures and/or pressures, and costly processing steps, all of which are objectionable from a commercial standpoint.

One object of the present invention is to provide a process by which the melting point of natural fats or oils containing esters of oleic acid and its homologues may be appreciably raised without the necessity for costly machinery or apparatus, wherein the steps of the process may be carried out under reasonable temperature and pressure conditions and in which the procedural steps are simple and inexpensive.

The process contemplates the conversion of the esters of oleic acid and its homologues contained in natural fats or oils to esters of elaidic acid and to the corresponding isomers of the homologues by isomerization.

It has been proposed to isomerize natural oils or fats by prolonged heating at high temperatures in the presence of certain metals or metallic salts in finely divided form, but such processes are not applicable to oils and fats which cannot withstand the necessary high temperatures of such processes. Thus, the flavor of dairy butter and cream, cocoa butter and the like is destroyed and the product thus rendered unsatisfactory for human consumption as food if subject to temperatures much in excess of 150° F. With these facts in mind another object of the invention is to isomerize the esters of oleic acid and its homologues contained in natural fats or oils by contact with an oxide or oxides of nitrogen at relatively low temperature.

Another object of the invention is to control the isomerization reaction by controlling the temperature of the reaction.

Another object of the invention is to contact an aqueous emulsion of the oil or fat with an oxide or oxides of nitrogen.

A further object of the invention is to contact an aqueous emulsion of the fat or oil with an oxide or oxides of nitrogen prepared either outside of the reaction chamber or in situ within the reaction mass.

These and other objects of the invention become apparent in the following specification wherein I have described preferred embodiments of the invention.

In the application of my improved and simplified process to natural fats or oils which are normally fluid, such as cocoanut oil, a desired quantity of fat or oil is placed in the reaction vessel together with a suitable quantity of water. The relative amounts of oil or fat and water used are chosen so as to produce an emulsion which will be relatively thin and fluid at ordinary temperatures. Naturally, the relative amounts of oil or fat and water emulsified will vary depending upon the condition of the fat or oil at ordinary temperatures, those which are solid or semi-solid at ordinary temperatures requiring relatively larger percentages of water to prepare an emulsion of the desired consistency than those fats or oils which at ordinary temperatures are fluid. If the fat or oil is solid or semi-solid at ordinary temperature the mixture of fat or oil and water should be heated to a point at which the fat or oil is in liquid or fluid state.

The proper amounts of fat or oil and water are thoroughly emulsified by agitation with or without heating and when the ingredients are completely emulsified an oxide or oxides of nitrogen are liberated within the emulsion while the agitation is continued. The oxide or oxides of nitrogen introduced into the emulsion might come from an outside source in which event they are preferably introduced at the bottom of the reaction vessel or, as will be explained more fully hereinafter, the reaction may be conducted so that the oxide or oxides of nitrogen may be developed in situ within the reaction mass.

The liberation of a suitable oxide or oxides of nitrogen such as NO, $NO_2$ causes a very rapid, almost instantaneous, isomerization of the esters of oleic acid and its homologues present in the emulsion with the result that they are converted into elaidic acid esters and the corresponding isomers of the homologues, with an appreciable densification of the mass and a corresponding raising of its melting point without in any way changing its specific gravity or chemical composition.

If it is desired to generate the oxides of nitrogen in situ within the reaction mass, I contemplate forming the emulsion by using a dilute aqueous solution of a mineral acid such as nitric acid, sulphuric acid or hydrochloric acid. While the degree of concentration of the acid is not critical, I find that the reaction is less vigorous and more readily controlled when a dilute solution, preferably between five and ten percent of the acid, is employed. The acid thus incorporated in the emulsion serves a dual function of enhancing the emulsification of the oil and water and forming the means by which the desired oxides of nitrogen may be developed within the mass when a suitable reaction product such as a nitrite is added to the emulsion. Thus, after the fat or oil and dilute aqueous solution of the acid have been emulsified by suitable agitation, a small amount of a nitrite such as sodium nitrite may be gradually added to the emulsion while the agitation is continued. The reaction between the nitrite so added and the acid produces nitrous acid anhydrid, $N_2O_3$ which, being unstable, immediately breaks down into $NO$ and $NO_2$, which oxides cause rapid isomerization of the mass with the conversion of the esters of the oleic acid and its homologues into esters of elaidic acid and corresponding isomers to the homologues.

It will be understood that the appreciably higher melting point of elaidic acid and its esters is responsible in the main for the raising of the melting point of the fat or oil so treated. The melting point of elaidic acid is approximately 45° C. as compared with the melting point of 0 or 2° C. of oleic acid.

It is important to control the reaction above described in a manner such that the oxide or oxides of nitrogen are brought rapidly into intimate contact with all portions of the emulsion. This may be assured by properly proportioning the amounts of water and oil or fat, or aqueous solution of acid and fat or oil, to provide an emulsion which at ordinary temperatures is relatively thin and fluid, and by controlling the temperature of the reaction mass. In respect to the temperature control, it is of course obvious that the gases liberated within the emulsion will pass more quickly or readily through an emulsion which is at a relatively higher temperature than one which is maintained at a relatively lower temperature. Therefore, to insure that the gases passing through the emulsion have time to intimately contact all portions thereof, the temperature of the reaction during isomerization is maintained within an approximate range of 20° F. to 50° F., depending upon the normal consistency or melting point of the fat or oil being processed. If the fat or oil has a relatively low melting point the temperature of the reaction may advantageously be maintained cooler than when processing a fat or oil whose melting point is relatively higher.

The process as thus described is capable of general application in treating natural fats or oils containing esters of oleic acid and its homologues, but it is to be understood, of course, that inasmuch as the degree by which the melting point of a given fat or oil may be raised is dependent in the main upon the conversion of oleic acid esters to elaidic acid esters, the degree to which the melting point of a given fat or oil is raised will be determined primarily upon the relative percentage of oleic acid esters present in such oils or fats. Thus, an oil or fat having a relatively low content of esters of oleic acid would, if treated by the hereindescribed process, have its melting point raised by a relatively lesser amount, whereas an oil or fat having a relatively high percentage of esters of oleic acid present therein would, when treated with the hereindescribed process, have its melting point raised a relatively greater degree. The process, as stated, is capable of general application and I give below by way of example, data indicating how the process affects the melting points of some well known fats or oils.

| Fat or oil | New melting points |
| --- | --- |
| Cocoanut oil | Approximately 115 to 120° F. |
| Peanut oil | Approximately 102° F. |
| Cocoa butter | Approximately 115 to 120° F. |
| Dairy butter | Approximately 108 to 110° F. |

It is apparent that oils having melting points within the range indicated by the foregoing data, may be stored for long periods of time without deterioration and without the necessity of refrigeration, at least to the extent required to keep the corresponding natural fats or oils.

At the conclusion of the isomerization following liberation of the oxides of nitrogen in situ within the mass of acidified water and oil emulsion, it is important to quickly wash the treated fat or oil to remove all traces of acid, reaction products, and oxides of nitrogen. Furthermore, it is important that the washing be done quickly inasmuch as the phenomenon of isomerization in this instance tends to be reversible and if agitation is continued for any appreciable time in the presence of the nitrous acid anhydrid, the converted esters of oleic acid and its homologues may revert to their original form. Thus, it is recommended that quickly following the stiffening of the emulsion, which stiffening is an indication of the occurrence of isomerization, the mass be suitably washed to remove the gases and undesirable reaction products. The washing, if necessary, may be done in warm water to facilitate intimate contact between the washing fluid and all parts of the mass.

As hereinbefore suggested, the oxides of nitrogen such as $NO$ and $NO_2$ may be delivered to the reaction mass from a suitable source, exterior of the reaction vessel, or they may be produced in situ within the reaction vessel by the reaction of the mineral acid upon a suitable nitrite. In some instances the reaction between the oxides of nitrogen and the emulsion is rather vigorous and I have found that this phase of the reaction may be controlled and kept within workable limits if, instead of $N_2O_3$ or a mixture of $NO$ and $NO_2$, nitrous oxide $N_2O$ be employed. Nitrous oxide may readily be obtained in pressure tanks and can conveniently be delivered to the bottom of the reaction vessel from such tanks by any suitable piping system. The use of nitrous oxide instead of nitrous acid anhydrid has the advantage that the isomerization reaction proceeds more slowly and thus it can be controlled by the length of time the gas is admitted to the reaction vessel.

Dairy cream may be treated by the hereindescribed process to give it greater consistency and to render it more easily whipped. Thus, dairy cream of substantially twenty percent butter fat, generally known as "table cream," when treated by my process, may be more readily whipped than the so-called "whipping cream" having a butter fat content of forty percent. In processing dairy cream it is unnecessary to add water to make the initial emulsion inasmuch as cream exists normally as an aqueous emulsion. The cream is placed in a suitable vessel and agitated while an oxide of nitrogen such as $N_2O$ is introduced into the body of cream, preferably at the bottom of the reaction vessel. The nitrous oxide is delivered to the body of cream being agitated until it reaches a desired consistency, preferably comparable to that of whipping cream or slightly heavier, it being noted that if the isomerizaton is allowed to continue until all of the oleic acid esters present in the cream have been converted into elaidic acid esters, the resulting product will be entirely too heavy and stiff for use as whipping cream. The extent to which the oleic acid esters of the cream are converted is, of course, optional, depending upon the use to be made of the cream. It might be stated at this point that cream processed as herein described is a desirable ingredient of ice-cream as it functions to produce, in this instance, a much more smooth and palatable food product.

Furthermore, no washing of the cream is necessary following isomerization since no reaction products are produced within the body of the cream by using nitrous oxide, and the cream being always fluid, permits the gas to pass readily through and from it; thus there is little possibility of there being any of the gas trapped within the body of cream as occurs when treating fats or oils which have relatively high melting points when processing, and are thus solid or semi-solid in form. It is suggested, however, that the cream to be processed as herein described, be so treated before pasteurization as the temperatures involved in pasteurization will function to completely remove all traces of gases from the cream. It is, of course, obvious that in processing dairy cream to isomerize the oleic acid esters therein, the oxides of nitrogen cannot be generated in situ as previously described, since the use of dilute acid solution would curdle or sour the cream. Dairy cream processed in this manner has its flavor unimpaired, while its consistency and whipping ability are considerably enhanced.

Dairy butter may be processed in a similar manner and will, by such process, have its melting point raised to approximately 108 to 110° F. without any loss of flavor, color or the like. Here again it is desirable to introduce the oxides of nitrogen from an external source rather than generate them in situ by the reaction between dilute acid solution and a nitrite as referred to hereinbefore.

The process is also particularly advantageous in treating cocoa butter for making chocolate for use in candy, cakes, confections and the like. It is well known that ordinary chocolate when subject to wide variations in temperature, is characterized by an unsightly grayish white formation known as "bloom." It has been determined that bloom on chocolate and in chocolate compounds is due primarily to the presence of the esters of oleic acid present in the cocoa butter fat of the chocolate and the fact that these esters possess a relatively low melting point (approximately 0 to 2° C.). By treating cocoa butter in accordance with my present process, and then combining it with the chocolate residue remaining after the cocoa butter has been removed from natural chocolate, the melting point of the chocolate may be raised to a point approximating 115 to 120° F., which is well beyond the temperature to which candies and confections are ordinarily subject. This high melting point not only insures against general deterioration of the chocolate but is a positive means of preventing the objectionable formation of bloom.

The process as described is also applicable generally in processing natural oils or fats of low melting point for the purpose of making lard or butter substitutes. Thus, cocoanut oil, peanut oil and the like, when treated as herein described, can be relied on to remain stable and solid at temperatures in excess of 100° F. and up to 115° F. Cotton-seed oil may also be processed by the herein described process but, due to the relatively low percentage of oleic acid esters contained therein, its melting point cannot, by this process, be raised appreciably beyond 85° F.

In view of the foregoing it is to be understood that my process generally contemplates isomerization of the esters of oleic acid and its homologues contained in natural fats or oils to convert the same to esters of elaidic acid and the corresponding isomers of the homologues which have an appreciably higher melting point than the oleic acid esters, and thus effectively raise the melting point of the natural fat or oil so treated. Furthermore, I contemplate isomerization by means of oxides of nitrogen developed either in situ within the reaction chamber or exteriorly thereof, and in controlling the reaction by means of temperature regulation of the mass to insure proper and intimate contact between the reaction products and the gases liberated therein.

It is to be understood that where I have herein referred to the use of a nitrite for introduction into an emulsion of fat or oil and dilute solution of a mineral acid, I am not limited to the use of sodium nitrite mentioned but that any metallic nitrite may be used with proper regard for the acid with which it is to be reacted. Thus, I may use potassium nitrite, sodium nitrite, barium nitrite, etc.

It is also to be understood that the temperature regulation of the reaction by cooling may be accomplished in any desired manner. Thus, the reaction vessel may be provided with a double walled or spaced jacket within which a suitable cooling fluid such as brine, ammonia or the like may be circulated. Similarly, the reaction vessel may be heated in instances where the fat being processed is solid or semi-solid at normal temperatures, by circulating within the jacket or double wall a suitable heating medium such as steam, hot water and the like.

It may be found desirable in some instances to add a small percentage of an inactive or inert coupling agent such as acetone to the water and oil or fat being emulsified. The acetone functions to facilitate emulsification. The acetone or other coupling agent does not enter into the chemical reaction and is washed clean of the isomerized fat or oil during the final washing operation.

It will be understood, of course, that no reaction products are formed by my process as described except when using the nitrite and dilute mineral acid for the purpose of producing nitrous acid anhydrid in situ. Thus, no actual washing of the processed fat or oil is necessary or essential except in cases where the dilute mineral acid and nitrite have been thus employed. However, due to the densification and solidification of many of the oils and fats processed without the use of mineral acid and nitrite, it is desirable to reduce the processed fat or oil to liquid form in order that all traces of the oxides of nitrogen and water which have been trapped within the body of fat or oil, may be removed.

As hereinbefore pointed out, the relative amounts of water or aqueous solution of acid and fat or oil vary in accordance with the normal consistency of the natural fat or oil being treated and it is therefore impossible to give any definite values which will serve for all purposes. However, I give below a specific example of the application of my process to cocoanut oil when treated with a dilute mineral acid and a nitrite:

Cocoanut oil _____ 1 part (2 oz.)
Dilute hydrochloric acid _____ 2 parts (4 oz.)
Sodium nitrite _____ 1 gram The foregoing constituents, when treated in accordance with my process, will produce a cocoanut oil having a melting point of approximately 115 to 120° F., which has the same flavor, specific gravity and chemical composition as that of the natural cocoanut oil.

In the application of my process to dairy cream it may be found desirable to agitate the cream less vigorously than ordinary fats or oils, while the nitrous oxide is being introduced into the cream, in order to preclude the possibility of whipping the cream at this stage. Furthermore, the agitation might advantageously be performed in a relatively deep vessel of relatively small cross-section in order to preclude the possibility of occluding any appreciable amount of air to the body of the cream while agitating it.

It is further to be understood that while I have referred specifically herein to edible fats or oils as distinguished from inedible fats or oils, the process is, as hereinbefore stated, capable of general application, and in this respect inedible as well as edible fats and oils may be processed as described. Thus, commercial products such as floor waxes, automobile polishes, shoe polishes and the like may be processed to provide such products with greater body or higher melting points, as described, thereby enabling such products to be manufactured at less expense by the introduction of equally meritorious materials of much lower cost.

Having thus described the invention, what I claim as new is:

1. The process of raising the melting point of a natural fat containing esters of oleic acid and its homologues, comprising emulsifying the fat with water and converting the oleic acid acid esters in the fat to elaidic acid esters by isomerization with nitrous acid anhydride.

2. The process of raising the melting point of a natural fat containing esters of oleic acid and its homologues, comprising emulsifying the fat with water and converting the oleic acid esters in the fat to elaidic acid esters by isomerization by agitating the emulsion in the presence of nitrous acid anhydride under temperature conditions ranging between 20° F. and 50° F.

3. The process of raising the melting point of a natural fat containing esters of oleic acid and its homologues, comprising converting the oleic acid esters in the fat to elaidic acid esters by forming an emulsion of said fat with water and agitating the same in the presence of an oxide of nitrogen and controlling the reaction by cooling the reaction vessel.

4. The process of raising the melting point of a natural fat containing esters of oleic acid and its homologues, comprising converting the oleic acid esters in the fat to elaidic acid esters by forming an emulsion of said fat with a dilute aqueous solution of a mineral acid and then adding a nitrite and agitating the mass.

5. The process of raising the melting point of a natural fat containing esters of oleic acid and its homologues, comprising forming an emulsion of said fat with water by agitating the fat and water at a temperature sufficiently high to maintain the fat fluid, agitating the emulsion so formed in the presence of an oxide of nitrogen to cause isomerization, and maintaining the temperature of the reaction during isomerization sub-normal.

6. The process of raising the melting point of a natural fat containing esters of oleic acid and its homologues, comprising converting the oleic acid esters in the fat to elaidic acid esters by forming an emulsion of said fat with water and an inert coupling agent and agitating the same in the presence of an oxide of nitrogen and controlling the reaction by cooling the reaction vessel.

7. The process of raising the melting point of a natural fat containing esters of oleic acid and its homologues, comprising converting the oleic acid esters in the fat to elaidic acid esters by forming an emulsion of said fat with water containing a small percentage of acetone and agitating the same in the presence of an oxide of nitrogen and controlling the reaction by cooling the reaction vessel.

8. A process for raising the melting point of a natural fat containing esters of oleic acid and its homologues comprising emulsifying the fat with water and converting the oleic acid esters and homologues into elaidic acid esters by isomerization including agitating the emulsion in the presence of an oxide of nitrogen.

9. The process of raising the melting point of cocoa butter comprising converting the oleic acid esters and the homologues therein to elaidic acid esters by forming an emulsion of said cocoa butter with water, agitating the emulsion in the presence of nitrous acid anhydride and cooling the reaction mass during isomerization.

10. A process for raising the melting point of a natural fat containing esters of oleic acid and its homologues comprising introducing nitrous anhydride into a body of said fat in a highly dispersed liquid form and agitating the fat while maintaining the temperature of the reaction mass below 50° F. by artificial cooling.

11. The process of raising the melting point of cocoa butter comprising agitating a body of cocoa butter in the liquid phase and under a temperature below that which will impair the natural taste and flavor thereof, while contacting the same with a gaseous medium containing an oxide of nitrogen to convert at least a portion of the esters of oleic acid and its homologues present in the cocoa butter into esters of elaidic acid and corresponding isomers of the homologues.

WILLIAM R. EIPPER.